US008845126B1

(12) United States Patent
Martzall

(10) Patent No.: US 8,845,126 B1
(45) Date of Patent: Sep. 30, 2014

(54) LOW PROFILE SOLAR LED LAMP

(71) Applicant: Lake Lite, Inc., Fort Wayne, IN (US)

(72) Inventor: Jeffrey S. Martzall, Fort Wayne, IN (US)

(73) Assignee: Lake Lite, Inc., Laotto, IN (US)

( * ) Notice: Subject to any disclaimer, the term of this patent is extended or adjusted under 35 U.S.C. 154(b) by 0 days.

(21) Appl. No.: 14/069,415

(22) Filed: Nov. 1, 2013

Related U.S. Application Data

(60) Provisional application No. 61/807,860, filed on Apr. 3, 2013.

(51) Int. Cl.
*F21L 4/00* (2006.01)
*F21L 4/08* (2006.01)

(52) U.S. Cl.
CPC . *F21L 4/08* (2013.01); *Y10S 362/80* (2013.01)
USPC ............. 362/183; 362/249.01; 362/249.02; 362/374; 362/375; 362/800

(58) Field of Classification Search
USPC ........ 362/183, 249.01, 249.02, 374, 375, 800
See application file for complete search history.

(56) References Cited

U.S. PATENT DOCUMENTS

| 2007/0263381 A1* | 11/2007 | Goldman et al. | 362/183 |
| 2012/0134143 A1* | 5/2012 | Lederer et al. | 362/183 |
| 2012/0262911 A1* | 10/2012 | Schweizer et al. | 362/183 |

* cited by examiner

*Primary Examiner* — William Carter
(74) *Attorney, Agent, or Firm* — Krieg DeVault LLP

(57) ABSTRACT

According to at least one aspect of the present disclosure, a lamp assembly includes a lens with a top portion and a sleeve portion, the sleeve portion defining an interior volume, and the top portion including a seating flange; a housing disposed within the interior volume, the housing comprising a first chamber and a second chamber adjacent the first chamber; a photovoltaic array disposed within the first chamber; an electronic circuit disposed within the housing and electrically connected to the photovoltaic array; a light source disposed within the first chamber and electrically connected to the circuit; and a battery disposed within the second chamber and electrically connected to the circuit, wherein the interior volume and the second chamber are sealed from the environment, and wherein the sleeve portion of the lens extends below the seating flange, thereby enabling the seating flange to seat upon a mounting surface.

20 Claims, 10 Drawing Sheets

LOW PROFILE SOLAR LED LAMP

CROSS-REFERENCE TO RELATED APPLICATIONS

This application is related to, and claims the priority benefit of, U.S. Design patent application Ser. No. 29/446,617, filed Feb. 26, 2013, and U.S. Provisional Patent Application Ser. No. 61/807,860, filed Apr. 3, 2013. The contents of each of these applications are hereby incorporated by reference in their entirety into this disclosure.

BACKGROUND

Outdoor general area lighting and accent lighting is often desired in remote locations where it is inconvenient or expensive to run electrical lines to power multiple lighting fixtures. Moreover, there are costs associated with powering remote lighting, and those costs are higher when the lighting is used throughout the dark, nighttime hours. Further, the use of conventional battery technology to power remote lighting fixtures, instead of electrical power lines, may be limited by the amp-hours of charge capable of being stored in a given battery.

Many situations in which remote lighting is desired include walkways that would be treacherous without guidance concerning the boundaries of the walkway. For example, docks and piers over open water are often used at night and may be far from land-based power lines. Pathways through gardens and exterior decking adjacent homes or businesses are additional examples. At the same time, general area lighting may detract from the ambience and character of some outdoor spaces at night, where more suitable lighting is desired. Further, where used for marking and illumination for foot traffic, it is desirable for such lighting to be close to or on the ground or walkway while not presenting a trip hazard or obstacle.

Therefore, there is a need for remote lighting that does not need to be wired to a power line and that is suitable for illuminating a walkway close to the walkway surface without creating a hazard.

BRIEF SUMMARY

According to at least one aspect of the present disclosure, a low profile solar lamp assembly includes a lens having a seating flange, a housing including a first chamber and a second chamber adjacent the first chamber, the housing attached to the lens, and the first chamber further defined by the lens, a photovoltaic array including at least one photovoltaic cell, the photovoltaic array disposed within the first chamber, an electronic circuit disposed within the housing and electrically connected to the photovoltaic array, a light source disposed within the first chamber and electrically connected to the circuit, and a battery disposed within the second chamber of the housing and electrically connected to the circuit, where the first chamber and at least a portion of the second chamber are sealed from the environment, and where the housing extends below the seating flange, thereby enabling the seating flange to seat upon a mounting surface. The lens may further include a sleeve portion, the sleeve portion defining an interior volume, where the housing is at least partially disposed within the interior volume of the sleeve portion, and the interior volume and the second chamber are sealed from the environment. The lamp assembly light source is a light emitting diode.

In at least one embodiment, the lamp assembly further includes a battery cap removably attached to the housing, whereby the battery may be removed and replaced from the second chamber. In at least one embodiment, the second chamber is reversibly sealed from the environment by one or more elastomeric seals. In at least one embodiment, at least a portion of the interior volume is sealed from the environment by one or more of the group consisting of elastomeric seals, sealants, and welds. The lens includes a lens recess adapted to accommodate at least a portion of the light source therein. In at least one embodiment, the lamp assembly further includes an access panel adapted to removably attach to the housing.

In at least one embodiment according to the present disclosure, a lamp assembly includes a lens, a housing comprising a flange portion and a body portion, the body portion defining a first chamber and a second chamber adjacent the first chamber, where the lens is attached to the flange portion and further defines the first chamber, a sleeve defining an interior volume and adapted to accommodate at least the body portion of the housing in the interior volume, the sleeve including an open proximal end and a closed distal end, a photovoltaic array including at least one photovoltaic cell, the photovoltaic array disposed in the first chamber, an electronic circuit disposed within the body and electrically connected to the photovoltaic array, a light source disposed within the first chamber and electrically connected to the circuit, and a battery disposed within the second chamber of the housing and electrically connected to the circuit where the proximal end of the sleeve is adapted to attach to the body portion of the housing such that at least a portion of the interior volume is sealed from the environment, and where the sleeve and the body portion extend below the flange portion, thereby enabling the flange portion to seat upon a mounting surface. At least a portion of the interior volume is reversibly sealed from the environment by one or more seals disposed between the housing and the sleeve. In at least one embodiment, the seals are elastomeric. In at least one embodiment, the lens is attached to the housing by an adhesive or a weld.

In at least one embodiment, the lamp assembly further includes a retention device removably attached to the sleeve, whereby the mounting surface is retained between the flange portion of the housing and the retention device. The sleeve further includes a plurality of threads on an exterior surface of the sleeve, and the retention device includes a plurality of mating threads adapted to engage the plurality of threads of the sleeve.

In at least one embodiment according to the present disclosure, the lamp assembly includes a lens having a top portion and a sleeve portion, the sleeve portion defining an interior volume, and the top portion having a seating flange, a housing disposed substantially within the interior volume of the sleeve portion, the housing having a first chamber and a second chamber adjacent the first chamber, the first chamber further defined by the lens, a photovoltaic array comprising at least one photovoltaic cell, the photovoltaic array disposed within the first chamber of the housing, an electronic circuit disposed within the first chamber and electrically connected to the photovoltaic array, a light source disposed within the first chamber and electrically connected to the circuit, and a battery disposed within the second chamber of the housing and electrically connected to the circuit where at least a portion of the first chamber and the second chamber are sealed from the environment, and where sleeve portion of the lens extends below the seating flange, thereby enabling the top portion to seat substantially flush upon a mounting surface.

DETAILED DESCRIPTION

Figure 1:
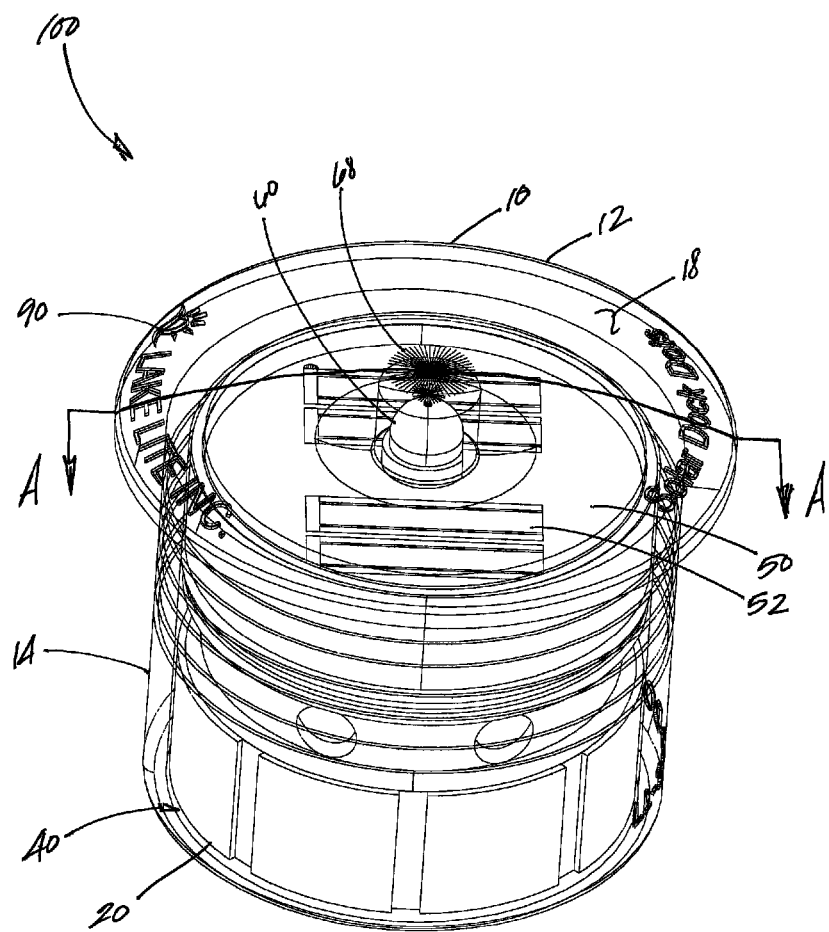
FIG. 1 shows an isometric view of an embodiment of a low profile solar lamp assembly according to the present disclosure.

The present application discloses various embodiments of a solar-powered lamp and methods for using and constructing the same. According to one aspect of the present disclosure, a solar-powered lamp having a low profile suitable to be deck-mounted is disclosed. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a low profile solar lamp assembly 100 according to at least one embodiment of the present disclosure. As shown in FIG. 1, the lamp assembly 100 may include a light source 60 and an array of photovoltaic cells 50 (hereinafter referred to as "PV array 50") disposed within a lens 10 having a transparent, or at least translucent, top portion 12 and a sleeve portion 14, which extends from the top portion 12. The sleeve portion 14 of the lens 10 may define an interior volume 40. The lens 10 may house the other components of the lamp assembly 100 within the interior volume 40 and protect the same from the ambient environment while both enabling ambient light to pass through the top portion 12, thereby falling incident upon the PV array 50 and enabling light emitted by the light source 60 to pass through the top portion 12 into the ambient environment. The lens 10 may further include indicia 90, such as trademarks or other product identifiers.

Figure 2:
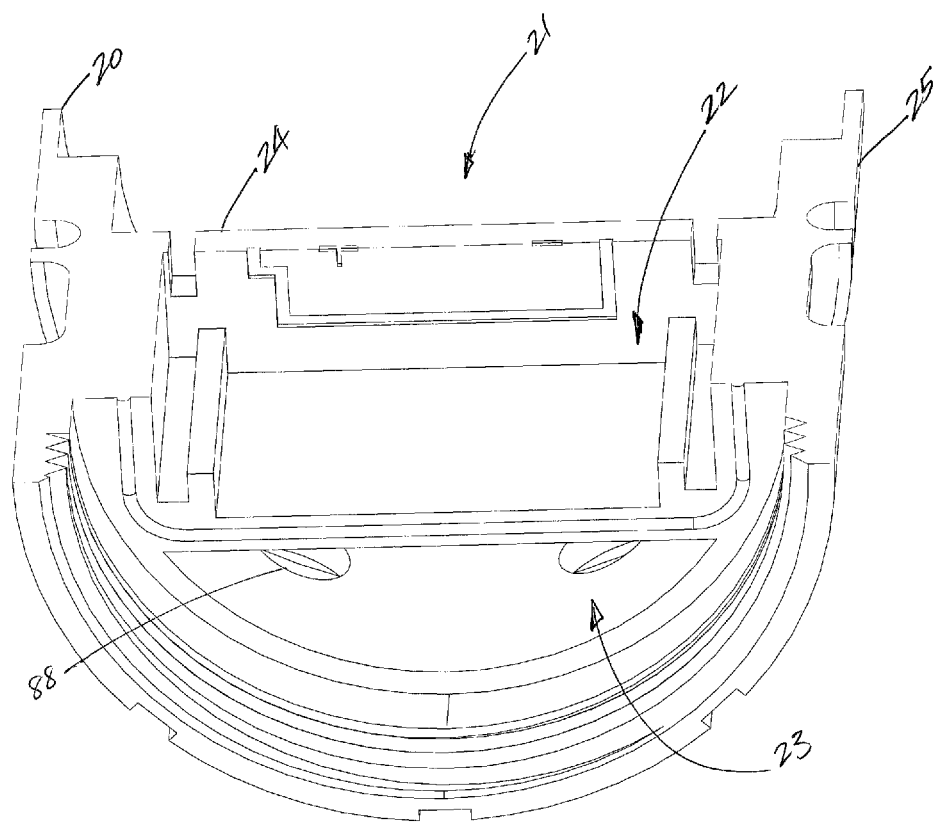
FIG. 2 shows a cross-sectional bottom isometric view taken at a plane A-A of an embodiment of a housing of the low profile solar lamp assembly of FIG. 1.
Figure 3:
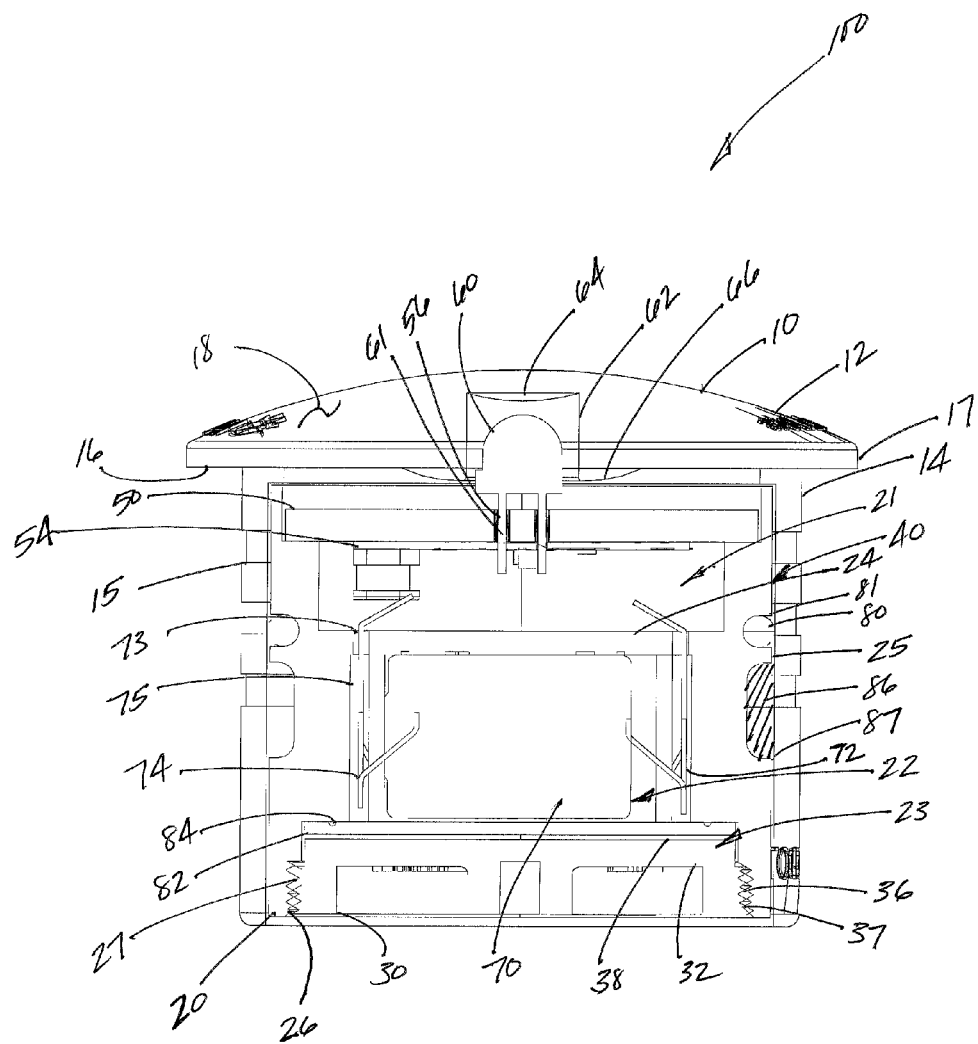
FIG. 3 shows a cross-sectional side view taken at a plane A-A of the embodiment of a low profile solar lamp assembly of FIG. 1.

The lamp assembly 100 may include a housing 20 disposed within the interior volume 40, where the housing 20 is configured to support and retain other components of the lamp assembly 100. As shown in FIG. 2, the housing 20 may include an outer wall 25, a first compartment 21, a second compartment 22 adjacent the first compartment 21, and a third compartment 23 adjacent the second compartment 22. The first compartment 21 and the second compartment 22 may be separated by an interior wall 24. As shown in FIG. 3, the lamp assembly 100 may include a printed circuit board 54 (hereinafter referred to as "PCB 54") electrically connected to the light source 60 and disposed within the first compartment 21 of the housing 20. The PCB 54 may include control circuitry capable of providing the charging and power functionality of the lamp assembly 100 as described herein. The PV array 50 may be disposed between the light source 60 and the PCB 54 such that one or more array openings 56 through the PV array 50 may enable one or more leads 61 from the light source 60 to make an electrical connection with the PCB 54. Alternatively, the array openings 56 may be sized to enable a substantial portion of the light source 60 to attach to the PCB 54, such as where the light source 60 is a surface-mount light emitting diode.

As shown in FIG. 3, the lamp assembly 100 may include a battery 70 disposed within the second compartment 22 of the housing 20 to provide electrical power to the light source 60. The lamp assembly 100 may further include an anode contact 72 and a cathode contact 74 disposed in contact slots 75 within the second compartment 22 such that anode contact 72 and the cathode contact 74 are capable of making electrical contact with the battery 70. The anode contact 72 and the cathode contact 74 may extend into the first compartment 21, via at least one contact opening 73 in the interior wall 24, and may be electrically connected to the PCB 54. In at least one embodiment of the present disclosure, the battery 70 may be a rechargeable battery that is capable of accepting and storing an electrical charge generated when the PV array 50 is exposed to a sufficient intensity of light energy. Further, the battery 70 may be capable of providing sufficient electrical power to energize the light source 60 via the control circuitry of the PCB 54. In at least one embodiment, the battery 70 may use any suitable rechargeable battery chemistry, including, but not limited to, nickel cadmium (NiCd), nickel metal hydride (NiMH), lithium iron phosphate (LiFePO4), and lithium-ion (Li-ion). Further, the battery 70 may include any suitable size, including, but not limited to, AA, AAA, AAAA, ½AA, and ⅓AAA. In at least one embodiment, the battery 70 may be a 1.2 Volt (V), 120 milliamp-hour (mAhr), ⅓AAA NiMH battery.

In at least one embodiment of the present disclosure, the PV array 50 may include a plurality of photovoltaic cells 52 electrically connected to one another in either series or parallel and further electrically connected to the PCB 54 as shown in FIGS. 1 and 3. The plurality of photovoltaic cells 52 operate to convert solar radiation incident upon the PV array 50 into direct current electricity using semiconductor materials known to exhibit the photovoltaic effect, whereby photons of light (e.g., from solar radiation) excite electrons in the semiconductor to a higher state of energy, enabling them to act as charge carriers for an electric current. The plurality of photovoltaic cells 52 may be made of materials such as monocrystalline silicon, polycrystalline silicon, amorphous silicon, cadmium telluride, copper indium gallium selenide/sulfide, or any suitable photovoltaic material. In at least one embodiment, the PV array 50 includes four photovoltaic cells 52 and generates 0.45 Watts (W) of electrical power.

As disclosed herein, the PCB 54 may include control circuitry capable of power management functions for automatic power control of the light source 60 and battery management functions for the interface between the PV array 50 and the battery 70. For example, the PCB 54 may be capable of automatically switching from a charging mode, in which electrical energy generated by the PV array 50 is fed to the battery 70, to a power mode, in which electrical energy stored in the battery 70 is fed to the light source 60. The voltage of the PV array 50 increases as the ambient light increases and decreases as the ambient light decreases. Consequently, the PCB 54 may enable automatic on-off control, which energizes the light source 60 when the ambient light is below a prescribed level (i.e., dusk) and deenergizes the light source 60 when the ambient light is above a prescribed level (i.e., dawn), by monitoring the voltage of the PV array 50. Further, the PCB 54 may include constant current control circuitry that regulates the power provided to the light source 60 by the battery 70 at a prescribed current level, thereby protecting the light source 60 from undesirable conditions, such as voltage spikes. In at least one embodiment, the PCB 54 may include a timer function that allows for a more complex power profile than simply on or off. In at least one embodiment, the PCB 54 may include a microprocessor to execute one or more control algorithms, thereby enabling the power control and battery management functions disclosed herein.

The top portion 12 of the lens 10 may include a low profile. As shown in FIG. 3, the top portion 12 may include an exterior surface 18, which extends beyond the width of the sleeve portion 14 and is bordered by a perimeter 17. The top portion 12 may further include a seating flange 16 opposing and substantially coextensive the exterior surface 18 between the perimeter 17 and sleeve portion 14. The exterior surface 18 may have a substantially dome-shaped profile, as shown in FIG. 3, whereby a height of the top portion 12 may be lesser at or near the perimeter 17 than at or near its center. The seating flange 16 may be substantially flat, thereby enabling the top portion 12 to seat against a flat mounting surface (not shown), where the sleeve portion 14 extends below said mounting surface, for example, through a suitable opening in the mounting surface. The sleeve portion 14 may include one or more retention features 15 adapted to facilitate installation and retention of the lamp assembly 100 into the mounting surface. In at least one exemplary embodiment, the sleeve portion 14 has a diameter of no more than 1.375 inches (in.).

Because the top portion 12 may be low-profile and the sleeve portion 14 (containing other components of the lamp assembly 100) extends below the mounting surface, the lamp assembly 100 is suitable for applications where lighting is desired close to the ground to be illuminated or accented. Such applications may include, but not be limited to, walkways, boat piers and docks, decks adjacent homes and businesses, boardwalks, bridges, and any other application where lighting is desired close to a mounting surface.

In at least one embodiment as shown in FIG. 3, the top portion 12 may include a recess 62 in communication with the interior volume 40 and extending toward the exterior surface 18. The recess 62 may enable the light source 60 to extend at least partially into the recess 62 and above the plane of seating flange 16, thereby enabling the light emitted by the light source 60 to be transmitted above the plane of seating flange 16. The recess 62 may include an upper optic 64 disposed opposite the exterior surface 18. The upper optic 64 may be capable of dispersing light emitted from the light source 60 using refraction and/or reflection, depending upon the angle of incidence of the emitted light to the upper optic 64. The upper optic 64 may include a generally convex shape or any suitable shape that enables a prescribed distribution pattern of emitted light.

In at least one embodiment, the top portion 12 may include a lower optic 66 around the perimeter of the recess 62 and extending at least partially into the interior volume 40. Some portion of the light emitted from the light source 60 may be emitted or otherwise directed (due to refraction or internal reflection) below the mounting surface as "lost light." However, the lower optic 66 may enable the recapture and emission of at least a portion of the lost light. The lower optic 66 may have a substantially concave shape from the perspective of the light source 60 and may be capable of refracting and/or reflecting light such that lost light incident thereupon is emitted via the exterior surface 18. The top portion 12 may further include a plurality of diffusion optics 68 disposed on the exterior surface 18, upper optic 64, or lower optic 66 as shown in FIG. 1. The plurality of diffusion optics 68 may act to further disperse light emitted by the light source 60.

Figure 4:
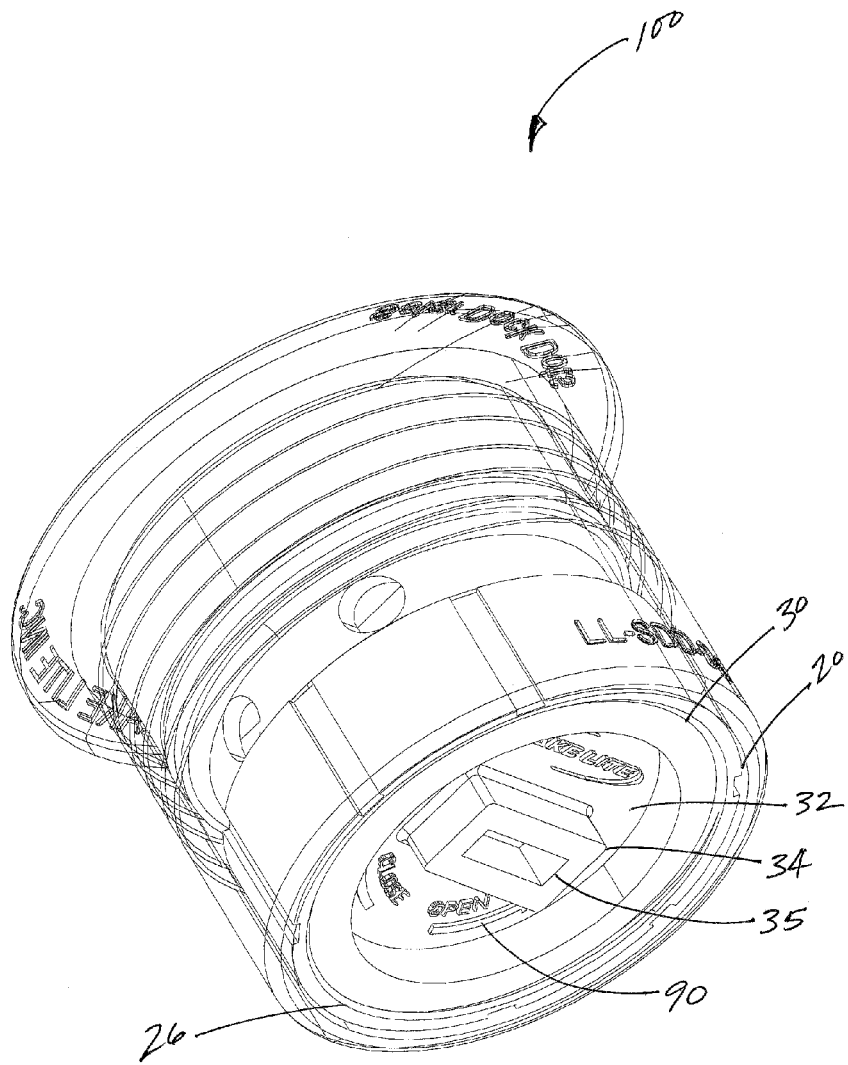
FIG. 4 shows an isometric view of the bottom of an embodiment of a low profile solar lamp assembly according to the present disclosure.

As shown in FIGS. 3 and 4, the lamp assembly 100 may include a cap 30 disposed within the third compartment 23 at or near a battery opening 26 of the housing 20. The battery opening 26 enables the installation, removal, and replacement of the battery 70 from the second compartment 22, and the cap 30 facilitates retention of the battery 70 within the housing 20. As shown in FIG. 3, the cap 30 may include an interior side 38, an opposing exterior side 32, and a perimeter surface 36 therebetween. The cap 30 may be configured to engage and attach to the housing 20. In at least one embodiment, the cap 30 may include cap threads 37 formed in the perimeter surface 36 and adapted to engage mating housing threads 27 disposed at or near the battery opening 26.

Referring to FIG. 4, the cap 30 may further include a boss 34 extending from the exterior side 32. The boss 34 may facilitate attachment of the cap 30 to the housing 20 by enabling a user to apply torque to the cap 30 during installation into or removal from the housing 20. The boss 34 may include a tool slot 35 therein to further facilitate attachment of the cap 30 to the housing 20. The tool slot 35 may be adapted to accept a hand tool, such as a screwdriver or wrench, thereby enabling a user to apply increased torque to the cap 30 while installing or removing it from the housing 20. The cap 30 may further include indicia 90 disposed on the exterior side 32 to provide a user with instructions concerning installation or removal of the cap 30. In at least one embodiment, the sleeve portion 14 may be generally cylindrically shaped, and similarly the housing 20 may have a corresponding cylindrical shape. In such an embodiment, the cap 30 may be similarly cylindrically shaped.

In at least one embodiment of the present disclosure, the lamp assembly 100 may include one or more seals to isolate the first compartment 21 and the second compartment 22 of the housing 20, and the components retained therein, from the ambient environment and to prevent the intrusion of water and other contaminates that may damage the electrical components of the lamp assembly 100 or cause condensation (i.e., fogging) on the lens 10. For example, as shown in FIG. 3, the lamp assembly 100 may include a housing seal 80 positioned at least partially within a housing seal groove 81 in the outer wall 25 of the housing 20. The housing seal 80 may fill a gap between the sleeve portion 14 of the lens 10 and the outer wall 25, thereby preventing intrusion therebetween and isolating the first compartment 21. Further, the housing seal 80 may also retain the housing 20 within the interior volume 40 of the lens 10 due to an interference fit between the housing seal 80, the housing 20, and the sleeve portion 14. In at least one embodiment, the housing seal 80 may be an O-ring having an uncompressed outer diameter sufficient to create an interference fit between the sleeve portion 14 and the housing 20. Alternatively, the housing seal 80 may be any suitable shape that enables a reliable seal and retention between the sleeve portion 14 and housing 20.

In at least one embodiment as shown in FIG. 3, the lamp assembly 100 may include a cap seal 82 disposed between the cap 30 and the second compartment 22 of the housing 20. The cap seal 82 may be compressed between the interior side 38 of the cap 30 and the second compartment 22. The housing 20 may include a seal rib 84 to facilitate a reliable seal between the cap 30 and the housing 20. In at least one embodiment, the cap seal 82 may be a flat seal. Alternatively, the cap seal 82 may be an O-ring disposed at least partially within a corresponding groove (not shown) in the housing 20 in place of the seal rib 84. In yet another alternative, the cap seal 82 could be an O-ring disposed at least partially within a groove (not shown) in the perimeter surface 36 of the cap 30 adjacent the cap threads 37. The cap seal 82 may be any suitable shape that enables a reliable seal between the cap 30 and housing 20.

In at least one embodiment, the lamp assembly 100 may include a sealant 86 disposed within a sealant channel 87 in the outer wall 25. Like the housing seal 80, the sealant 86 may fill the gap between the sleeve portion 14 of the lens 10 and the housing 20, thereby preventing intrusion therebetween, isolating the first compartment 21, and further retaining the housing 80 within the sleeve portion 14. In at least one embodiment, the lamp assembly 100 may include either the housing seal 80 or the sealant 86 or both. The sealant 86 may be dispensed or injected into the sealant channel 87 via one or more sealant ports 88 through the outer wall 25 as shown in FIG. 2. The sealant 86 may be any suitable material including, but not limited to, silicone, epoxy, and hot melt.

Figure 5:
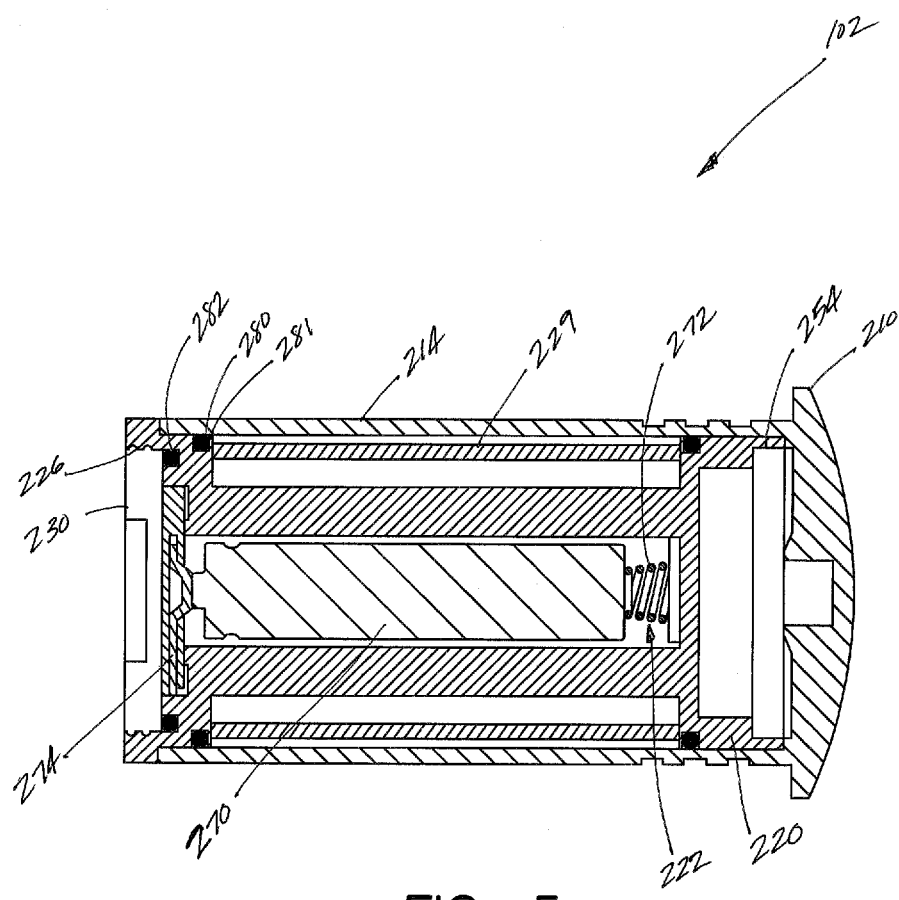
FIG. 5 shows a cross-sectional side view take at the plane A-A of FIG. 1 of an alternative low profile solar lamp assembly according to the present disclosure.

In at least one embodiment according to the present disclosure, the lamp assembly 100 may include a different orientation for the battery 70. As shown in FIG. 5, a lamp assembly 102 may include a battery 270 that is oriented axially within a battery compartment 222 of a housing 220 that is disposed within a sleeve portion 214 of a lens 210. The lamp assembly 102 may include an anode contact 272 and a cathode contact 274, each electrically connected to the battery 270 and a printed circuit board 254 having the same or similar functionality as the PCB 54. Either the anode contact 272 or the cathode contact 274 may be adjacent or mounted to a cap 230 disposed within a battery opening 226. The battery opening 226 enables the installation, removal, and replacement of the battery 270 from the battery compartment 222, and the cap 230 facilitates both retention of the battery 270 within the housing 220 and electrical contact between the battery 270 and the contact 272, 274.

In at least one alternative embodiment, the lamp assembly 102 may further include an access panel 229 adapted to facilitate retention of the battery 270 within the battery compartment 222. In such an embodiment, either the anode contact 272 or the cathode contact 274 may be mounted to the housing 20, and the battery 270 may be installed, removed, and replaced by first removing the housing 220 from the lens 210 and further disengaging the access panel 229.

In at least one embodiment according to the present disclosure, the lamp assembly 102 may include one or more seals to isolate the battery 270 and other components contained within the lens 210, from the ambient environment and to prevent the intrusion of water and other contaminates that may damage the electrical components of the lamp assembly 102 or cause condensation (i.e., fogging) on the lens 210. For example, as shown in FIG. 5, the lamp assembly 102 may include a housing seal 280 positioned at least partially within a housing seal groove 281 in the housing 220. The housing seal 280 may fill a gap between the sleeve portion 214 of the lens 210 and the housing 220, thereby preventing intrusion therebetween. Further, the housing seal 280 may also retain the housing 220 within the lens 210 due to an interference fit between the housing seal 280, the housing 220, and the sleeve portion 214. In at least one embodiment, the housing seal 280 may be an O-ring having an uncompressed outer diameter sufficient to create an interference fit between the sleeve portion 214 and the housing 220. Alternatively, the housing seal 280 may be any suitable shape that enables a reliable seal and retention between the sleeve portion 214 and housing 220. In at least one further alternative embodiment, the housing 220 may be sealed to the sleeve portion 214 of the lens 210 by a welding process. In such an embodiment, the welding process may include, but not be limited to, sonic, vibrational, orbital, and hot plate welding.

In at least one embodiment, the lamp assembly 102 may include a cap seal 282 positioned at least partially within a housing seal groove 281 in the housing 220 and disposed between the cap 230 and the housing 220 as shown in FIG. 5. In at least one alternative embodiment, the cap seal 282 may be disposed at least partially within a groove (not shown) in the perimeter of the cap 230. Further, the cap seal 282 may be any suitable shape that enables a reliable seal between the cap 230 and housing 220. As a non-limiting example, the cap seal 282 may be a flat seal or an O-ring. In at least one further alternative embodiment, the lamp assembly 102 may include a sealant in place of seals 280 and 282.

Figure 6:
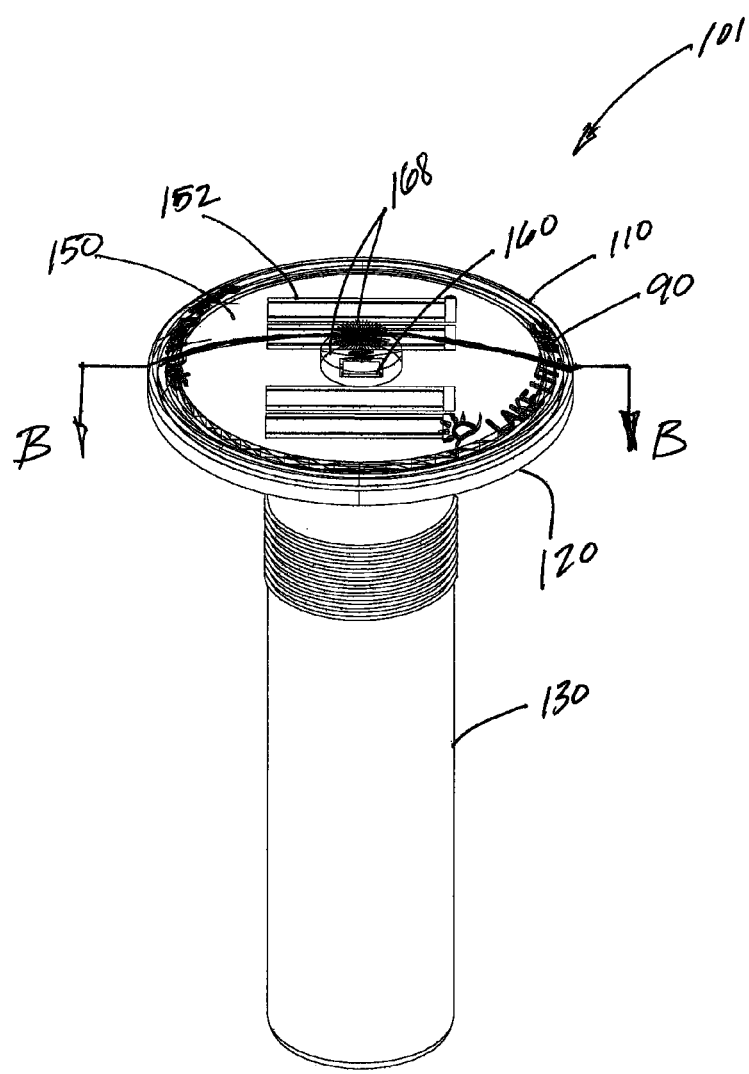
FIG. 6 shows an isometric view of an embodiment of a low profile solar lamp assembly according to the present disclosure.
Figure 7:
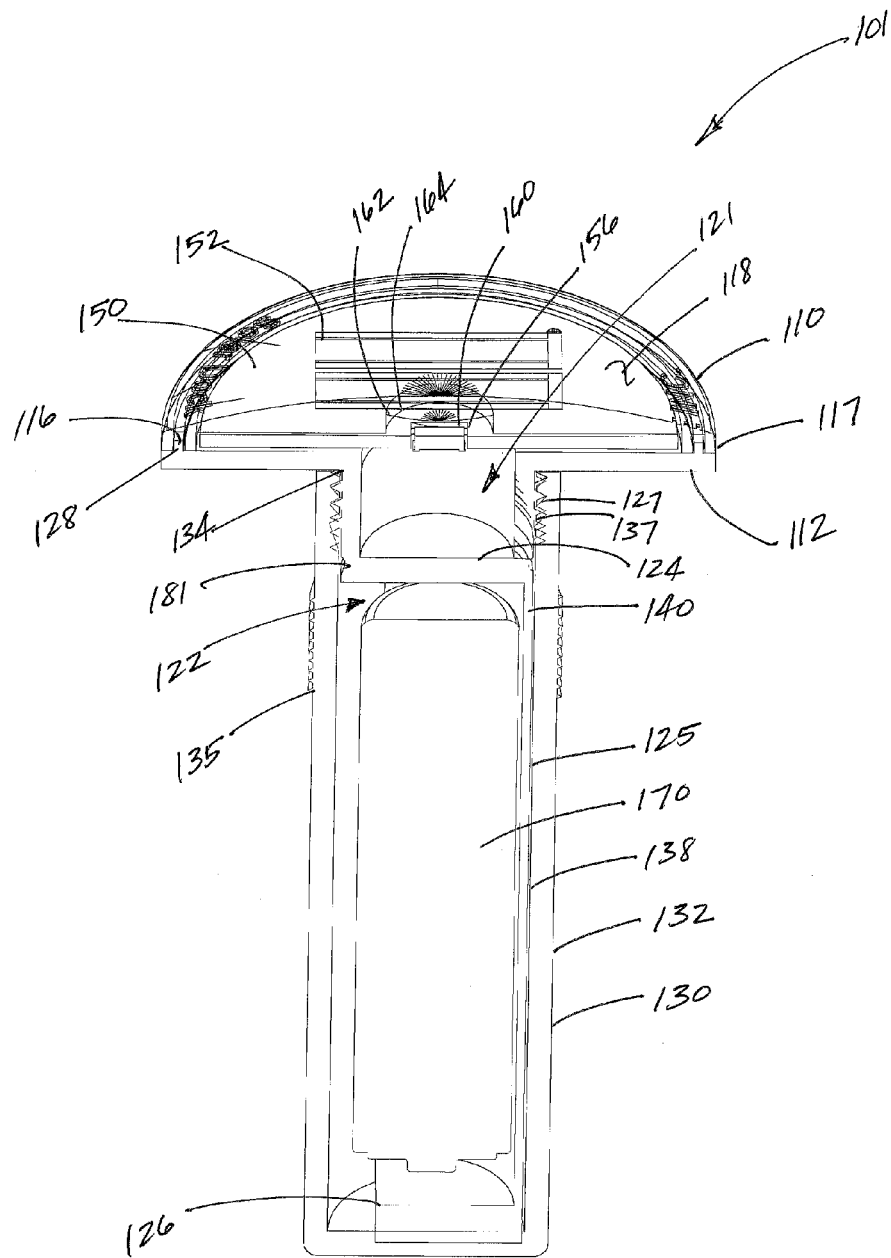
FIG. 7 shows a cross-sectional isometric view taken at a plane B-B of the embodiment of a low profile solar lamp assembly of FIG. 5.

FIG. 6 shows a low profile solar lamp assembly 101 according to at least one alternative embodiment of the present disclosure. As shown in FIG. 6, the lamp assembly 101 may include a transparent, or at least translucent, lens 110 attached to a housing 120, which is at least partially disposed within a sleeve 130. The lamp assembly 101 may further include a light source 160 and an array of photovoltaic cells 150 (hereinafter referred to as "PV array 150") disposed between the lens 110 and the housing 120 as shown in FIG. 7. The lens 110 both enables ambient light to pass therethrough and fall incident upon the PV array 150 and enables light emitted by the light source 160 to pass therethrough to the ambient environment. The lens 110 may further include indicia 90, such as trademarks or other product identifiers.

Figure 8:
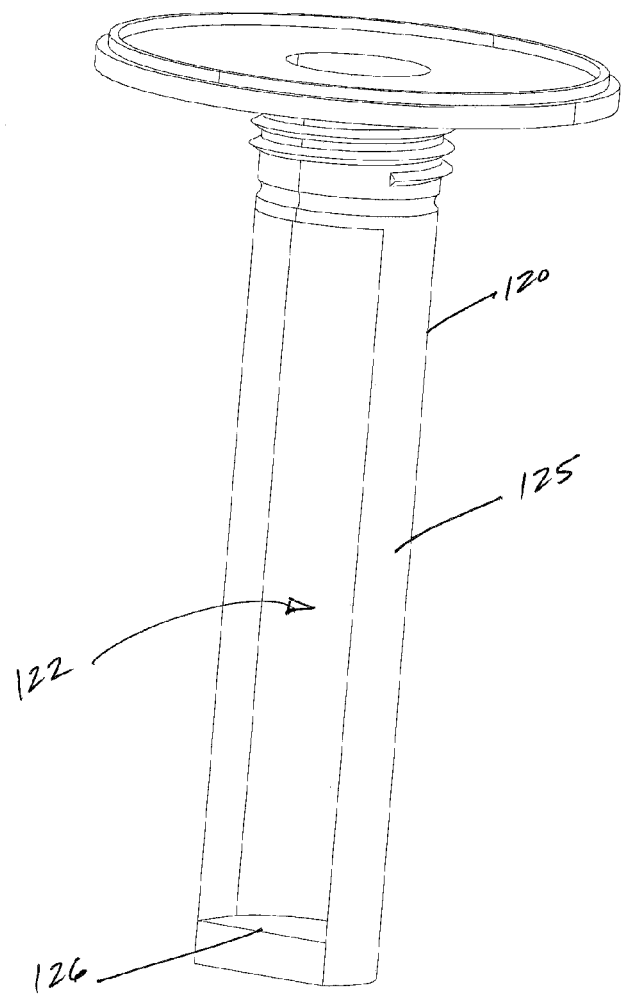
FIG. 8 shows an isometric view of an embodiment of a housing of a low profile solar lamp assembly according to the present disclosure.

As shown in FIG. 7, the housing 120 may include a flange portion 112 and a body portion 140, which extends from the flange portion 112. The flange portion 112 and lens 110 may define a first compartment 121. The body portion 140 of the housing 120 may include an outer wall 125 defining the body portion 140 and a second compartment 122 adjacent the first compartment 121, where the first compartment 121 and the second compartment 122 may be separated by an interior wall 124. In at least one embodiment, the body portion 140 may be generally cylindrically shaped and, similarly, the sleeve 130 may have a corresponding cylindrical shape. As shown in FIGS. 7 and 8, the housing 120 may further include a battery opening 126 in the outer wall 125. The battery opening 126 enables the installation, removal, and replacement of the battery 170 from the second compartment 122.

The lamp assembly 101 may include a printed circuit board 154 (hereinafter referred to as "PCB 154") (not shown) electrically connected to the light source 160 and disposed within the first compartment 121 of the housing 120. The PCB 154 may include control circuitry capable of providing the charging and power functionality of the lamp assembly 101 as described herein. The PV array 150 may be disposed between the light source 160 and the PCB 154. Accordingly, as shown in FIG. 7, one or more array openings 156 through the PV array 150 may enable one or more leads from the light source 160 to make an electrical connection with the PCB 154. Alternatively, the array openings 156 may include a single opening 156 sized to enable a substantial portion of the light source 160 to attach to the PCB 154, such as where the light source 160 is a surface-mount light emitting diode.

The lamp assembly 101 may include a battery 170 disposed within the second compartment 122 of the housing 120 to provide electrical power to the light source 160. The lamp assembly 101 may further include an anode contact 172 (not shown) and a cathode contact 174 (not shown) disposed in contact slots 175 (not shown) within the second compartment 122 such that anode contact 172 and the cathode contact 174 are capable of making electrical contact with the battery 170. The anode contact 172 and the cathode contact 174 may extend into the first compartment 121, via at least one contact opening 173 (not shown) in the interior wall 124, and may be electrically connected to the PCB 154. In at least one embodiment of the present disclosure, the battery 170 may be a rechargeable battery that is capable of accepting and storing an electrical charge generated when the PV array 150 is exposed to a sufficient intensity of light energy. Further, the battery 170 may be capable of providing sufficient electrical power to energize the light source 160 via the control circuitry of the PCB 154. In such an embodiment, the battery 170 may use any suitable rechargeable battery chemistry, including, but not limited to, NiCd, NiMH, LiFePO4, and Li-ion. Further, the battery 170 may include any suitable size, including, but not limited to, AA, AAA, AAAA, ½AA, and ⅓AAA. In at least one embodiment, the battery 170 may be a 1.2 V, 120 mAhr, AAA NiMH battery.

In at least one embodiment of the present disclosure, the PV array 150 may include a plurality of photovoltaic cells 152 electrically connected to one another in either series or parallel and further electrically connected to the PCB 154 as shown in FIGS. 6 and 7. The plurality of photovoltaic cells 152 may be made of materials such as monocrystalline silicon, polycrystalline silicon, amorphous silicon, cadmium telluride, copper indium gallium selenide/sulfide, or any suitable photovoltaic material. In at least one embodiment, the PV array 150 includes four photovoltaic cells 152 and generates 0.45 W. The PCB 154 may include control circuitry capable of power management functions for automatic power control of the light source 160 and battery management functions for the interface between the PV array 150 and the battery 170. For example, the PCB 154 may be capable of the same or similar functions as the PCB 54 as disclosed herein.

The lens 110 may include a low profile. As shown in FIG. 7, the lens 110 may include a lens perimeter 117 bordering an exterior surface 118, which is substantially coextensive of the flange portion 112 of the housing 120. The exterior surface 118 may have a substantially dome-shaped profile, whereby a height of the lens 110 may be lesser at or near the lens perimeter 117 than at or near the center of the lens 110. The flange portion 112 may be substantially flat, thereby enabling the housing 120 to seat against a flat mounting surface (not shown), where the body portion 140 extends below said mounting surface, for example, through a suitable opening in the mounting surface. In at least one exemplary embodiment, the sleeve 130 has a diameter of no more than 1.0 in.

Because the lens 110 may be low-profile and the housing 120 and sleeve 130 (containing other components of the lamp assembly 101) extend below the mounting surface, the lamp assembly 101 is suitable for applications where lighting is desired close to the ground to be illuminated or accented. Such applications may include, but not be limited to, walkways, boat piers and docks, decks adjacent homes and businesses, boardwalks, bridges, and any other application where lighting is desired close to a mounting surface.

In at least one embodiment, the lens 110 may include a recess 162 in communication with the first compartment 121 and extending toward the exterior surface 118. The recess 162 may be adapted to enable the light source 160 to extend at least partially into the recess 162 and above the plane of the flange portion 112, thereby enabling the light emitted by the light source 160 to be transmitted above the plane of the flange portion 112. The recess 162 may include an upper optic 164 opposite the exterior surface 118. The upper optic 164 may be capable of dispersing light emitted from the light source 160 using refraction and/or reflection, depending upon the angle of incidence of the emitted light to the upper optic 164. The upper optic 164 may include a generally convex shape or any suitable shape that enables a prescribed distribution pattern of emitted light.

In at least one embodiment, the lens 110 may include a lower optic 166 (not shown) around the perimeter of the recess 162 and extending at least partially into the first compartment 121. The lower optic 166 may enable the recapture and emission of at least a portion of the lost light. The lower optic 166 may have a substantially concave shape from the perspective of the light source 160 and may be capable of refracting or reflecting light such that the lost light incident thereupon is emitted via the exterior surface 118. The lens 110 may further include a plurality of diffusion optics 168 in the exterior surface 118, upper optic 164, and lower optic 166 as shown in FIG. 6. The plurality of diffusion optics 168 may act to further disperse light emitted by the light source 160.

As shown in FIG. 7, the body portion 140 of the housing 120 may be disposed within a volume defined by the sleeve 130. The sleeve 130 facilitates retention of the battery 170 within the housing 120, protects the battery 170 from the ambient environment, and enables the installation, removal, and replacement of the battery 170 from the second compartment 122. The sleeve 130 may include an interior surface 138, an opposing exterior surface 132, and an opening 134 disposed adjacent the flange portion 112 of the housing 120.

The sleeve 130 may be configured to engage and attach to the housing 120. In at least one embodiment, the sleeve 130 may include sleeve threads 137 formed in the interior surface 138 at or near the opening 134 and adapted to engage mating housing threads 127 in the outer wall 125 of the housing 120 at or near the flange portion 112. The sleeve 130 may further include a retention feature 135 in the exterior surface 132. The retention feature 135 may facilitate installation and retention of the lamp assembly 101 within a mounting surface. The retention feature 135 may further facilitate engagement of the sleeve 130 to the housing 120 by increasing the grip or torque resistance of the sleeve 130. The sleeve 130 may further include indicia 90 (not shown) on the exterior surface 132 to provide a user with instructions concerning engagement and disengagement of the sleeve 130 from the housing 120.

In at least one embodiment of the present disclosure, the lamp assembly 101 may include one or more seals to isolate the first compartment 121 and the second compartment 122 of the housing 120, and the components retained therein, from the ambient environment and to prevent the intrusion of water and other contaminates that may damage the electrical components of the lamp assembly 101 or cause condensation (i.e., fogging) on the lens 110. For example, the lamp assembly 101 may include a housing seal 180 (not shown) positioned at least partially within a housing seal groove 181 in the outer wall 125 of the housing 120. The housing seal 180 may fill a gap between the sleeve 130 and the housing wall 125, thereby preventing intrusion therebetween and isolating the first compartment 121 and second compartment 122. Further, the housing seal 180 may also retain the housing 120 within the sleeve 130 due to an interference fit between the housing seal 180, the housing 120, and the sleeve 130. In at least one embodiment, the housing seal 180 may be an O-ring having an uncompressed outer diameter sufficient to create an interference fit between the sleeve 130 and the housing 120. Alternatively, the housing seal 180 may be any suitable shape that enables a reliable seal between the sleeve 130 and housing 120.

In at least one embodiment, the lamp assembly 101 may include a lens seal 182 (not shown) disposed between the lens 110 and flange portion 112 of the housing 120 at or near the perimeter 117. As shown in FIG. 7, the housing 120 may include a seal rib 128 extending from the flange portion 112. The lens 110 may include a corresponding seal channel 116 located at or near the perimeter 117 and adapted to mate with the seal rib 128. During assembly of the lamp assembly 101, the lens seal 182 may be placed within the seal channel 116 prior to engagement with the seal rib 128. In at least one embodiment, the lens seal 182 may include an adhesive material capable of both structurally bonding and environmental sealing the lens 110 to the flange portion 112.

In at least one alternative embodiment, the lamp assembly 101 may not include a lens seal 182. Instead, the lens 110 may be sealed to the housing 120 by a welding process in which a small portion of each of the seal rib 128 and the seal channel 116 are heated and melted prior to being engaged, and a bond is formed therebetween as the materials cool. In such an embodiment, the welding process may include, but not be limited to, sonic, vibrational, orbital, and hot plate welding.

Figure 9:
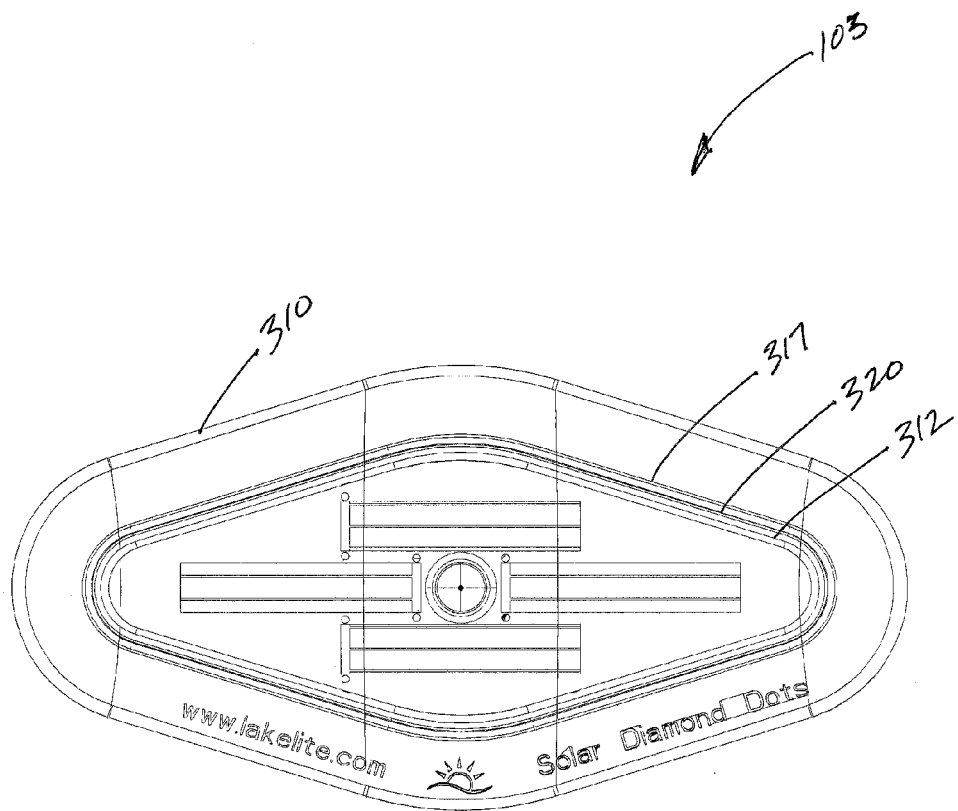
FIG. 9 shows a top view of an embodiment of a low profile solar lamp assembly according to the present disclosure.

In at least one embodiment according to the present disclosure, the shape of the lamp assembly extending above the mounting surface need not be generally circular as lamp assemblies 100, 101, 102 are depicted. As shown in FIG. 9, the lamp assembly 103 may include a lens 310 having a generally diamond shape. The lens 310 may further include a lens perimeter 317 that has a corresponding generally diamond shape. In such an embodiment, the lamp assembly 103 may include a housing 320 with a flange portion 312 that is similarly generally diamond shaped. Alternatively, the lens 310 may have any suitable or desired shape, and accordingly the lens perimeter 317 and flange portion 312, provided that the lens 310 maintains a low profile.

Figure 10:
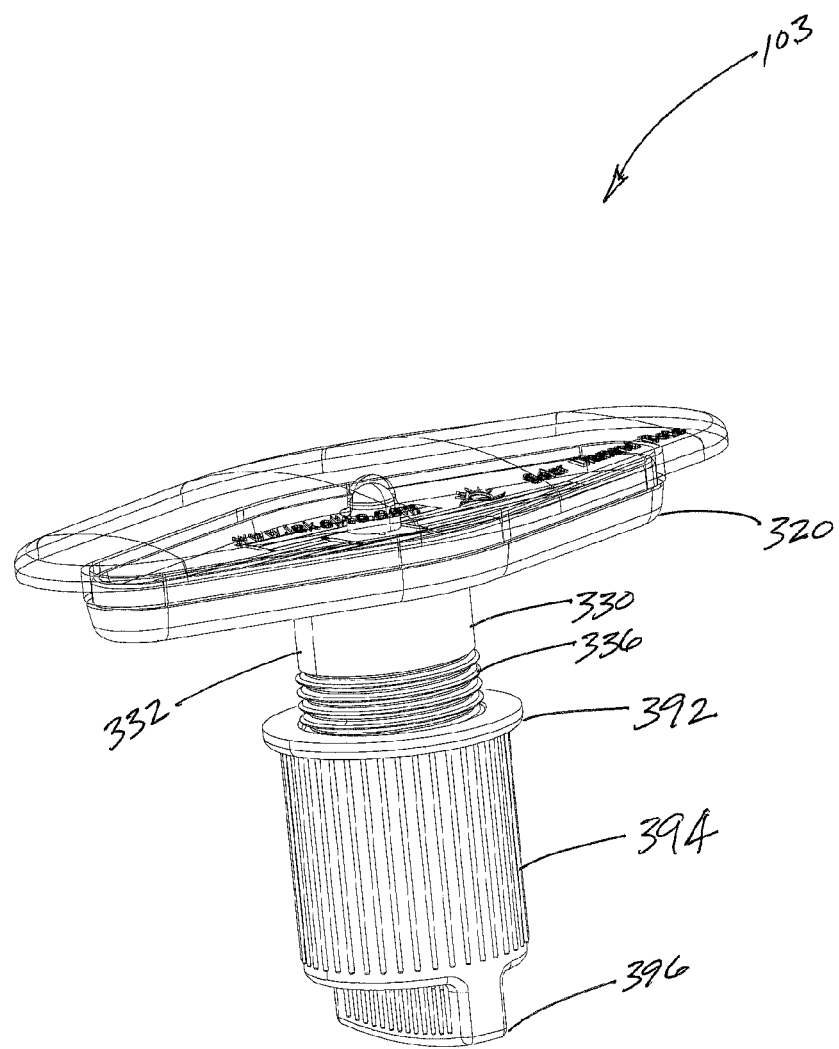
FIG. 10 shows a side view of an embodiment of a low profile solar lamp assembly according to the present disclosure.

As shown in FIG. 10, the lamp assembly 103 may further include a sleeve 330 adapted to accommodate, engage, and attach to the housing 320 in a manner similar to that of the sleeve 130 and housing 120 of the lamp assembly 101. In at least one embodiment, the lamp assembly 103 may include a retention device 392 to facilitate retention of the lamp assembly 103 to the mounting surface. As shown in FIG. 10, in such an embodiment the sleeve 330 may include retention threads 336 disposed along an exterior surface 332. The retention device 392 may include a body 394 that includes distal portion 396, where the distal portion 396 may be adapted to facilitate engagement of the retention device 392 to the sleeve 330. The retention device 392 may further include mating threads (not shown) disposed within the body 394 and adapted to engage the retention threads 336. In such an embodiment, the retention device 392 may be rotated around the sleeve 330 until the body 394 seats against an underside of the mounting surface. In at least one embodiment, instead of a threaded fastener as depicted in FIG. 10, the retention device 392 may be include a clip or other fastener that may engage the sleeve 330 and the mounting surface, thereby retaining the lamp assembly 103.

In at least one embodiment according to the present disclosure, the light source 60 may be a light emitting diode ("LED"). LEDs are relatively efficient on a lumen per Watt basis and may be suitable for applications, such as the lamp assemblies 100, 101, 102, 103, where power is limited by the storage capacity of a battery.

In at least one embodiment according to the present disclosure, the lenses 10, 110, 210, 310 may be a substantially optically transparent or translucent material, including but not limited to glass, cyclic olefin copolymer (COC), polymethylmethacrolate (PMMA), polycarbonate (PC), PC/PMMA composite, silicones, fluorocarbon polymers, and polyetherimide (PEI). Because they may be used in applications close to the ground, lenses 10, 110, 210, 310 may be a tough material capable of withstanding at least the weight of a person. Further, because they may be exposed to ultraviolet (UV) radiation in addition to visible light, the lenses 10, 110, 210, 310 may be a UV-stable material or, alternatively, include a UV-stable coating to protect the lenses 10, 110, 210, 310 from hazing and yellowing resulting from UV radiation exposure.

Because they need not be transparent or translucent, the other structural components disclosed herein, including the housings 20, 120, 220, 320, the battery caps 30, 230 and the sleeves 130, 330, may be any suitable material including, but not limited to, moldable polymers and metals. The seals disclosed herein, including housing seals 80, 180, 280 and cap seals 82, 282 may be any suitable material including, but not limited to, elastomers.

While various embodiments of a solar-powered lamp and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A lamp assembly, the lamp assembly comprising:
a lens comprising a seating flange and a sleeve portion, the sleeve portion extending from the seating flange and defining a volume, wherein the seating flange extends laterally from the sleeve portion such that a width of the seating flange is greater than a width of the sleeve portion, and wherein the seating flange defines a seating surface upon which the assembly may seat upon a mounting surface such that the assembly extends through the mounting surface, and at least a portion of the lens extends above the mounting surface;
a housing comprising a first chamber and a second chamber adjacent the first chamber and separated by a housing wall, the housing disposed within the volume of the sleeve portion, and the first chamber further defined by the lens;
a photovoltaic array comprising at least one photovoltaic cell, the photovoltaic array disposed within the first chamber;
an electronic circuit disposed within the housing and electrically connected to the photovoltaic array;
a light source disposed within the first chamber and electrically connected to the circuit such that the light source extends above the mounting surface; and
a battery disposed within the second chamber of the housing and electrically connected to the circuit, and
wherein the first chamber and at least a portion of the second chamber are sealed from the environment.

2. The lamp assembly of claim 1, wherein the light source is a light emitting diode.

3. The lamp assembly of claim 1, the lamp assembly further comprising a battery cap removably attached to the housing, whereby the battery may be removed and replaced from the second chamber.

4. The lamp assembly of claim 1, wherein the second chamber is reversibly sealed from the environment by one or more elastomeric seals.

5. The lamp assembly of claim 1, wherein at least a portion of the interior volume is sealed from the environment by one or more of the group consisting of elastomeric seals, sealants, and welds.

6. The lamp assembly of claim 1, wherein the lens includes a lens recess adapted to accommodate at least a portion of the light source therein.

7. The lamp assembly of claim 1, the lamp assembly further comprising an access panel adapted to removably attach to the housing.

8. A lamp assembly, the lamp assembly comprising:
a lens;
a housing comprising a flange portion and a body portion, the body portion extending from the flange portion and defining a first chamber and a second chamber adjacent the first chamber and separated by a housing wall, wherein the flange portion extends laterally from the body portion such that a width of the flange portion is greater than a width of the body portion, and wherein the lens is attached to the flange portion and further defines the first chamber;
a sleeve including an open proximal end and a closed distal end and defining an interior volume therebetween, wherein the body portion is disposed within the interior volume;
a photovoltaic array comprising at least one photovoltaic cell, the photovoltaic array disposed in the first chamber;
an electronic circuit disposed within the first chamber and electrically connected to the photovoltaic array;
a light source disposed within the first chamber and electrically connected to the circuit such that the light source extends above the mounting surface; and
a battery disposed within the second chamber of the housing and electrically connected to the circuit;
wherein the proximal end of the sleeve is attached to the body portion of the housing such that at least a portion of the interior volume is sealed from the environment, and
wherein the flange portion defines a seating surface upon which the assembly may seat upon a mounting surface such that the assembly extends through the mounting surface, and at least a portion of the lens extends above the mounting surface.

9. The lamp assembly of claim 8, wherein the light source is a light emitting diode.

10. The lamp assembly of claim 8, wherein the battery is a rechargeable battery.

11. The lamp assembly of claim 8, wherein at least a portion of the interior volume is reversibly sealed from the environment by one or more seals disposed between the housing and the sleeve.

12. The lamp assembly of claim 11, wherein the seals are elastomeric.

13. The lamp assembly of claim 8, wherein the lens is attached to the housing by an adhesive or a weld.

14. The lamp assembly of claim 8, the lamp assembly further comprising a retention device removably attached to the sleeve, whereby the mounting surface is retained between the flange portion of the housing and the retention device.

15. The lamp assembly of claim 14, wherein the sleeve further comprises a plurality of threads on an exterior surface of the sleeve, and
the retention device comprises a plurality of mating threads adapted to engage the plurality of threads of the sleeve.

16. The lamp assembly of claim 8, wherein the lens includes a lens recess adapted to accommodate at least a portion of the light source therein.

17. A lamp assembly, the lamp assembly comprising:
a lens comprising a top portion and a sleeve portion, the sleeve portion extending from the top portion and defining an interior volume, and the top portion comprising a seating flange, wherein the seating flange extends laterally from the sleeve portion such that a width of the seating flange is greater than a width of the sleeve portion, and wherein the seating flange defines a seating surface upon which the assembly may seat upon a mounting surface such that the assembly extends through the mounting surface, and at least a portion of the lens extends above the mounting surface;
a housing disposed partially within the interior volume of the sleeve portion, the housing comprising a first chamber and a second chamber adjacent the first chamber and separated by a housing wall, the first chamber further defined by the lens;
a photovoltaic array comprising at least one photovoltaic cell, the photovoltaic array disposed within the first chamber of the housing;
an electronic circuit disposed within the first chamber and electrically connected to the photovoltaic array;
a light source disposed within the first chamber and electrically connected to the circuit such that the light source extends above the mounting surface; and
a battery disposed within the second chamber of the housing and electrically connected to the circuit, wherein at least a portion of the first chamber and the second chamber are sealed from the environment.

18. The lamp assembly of claim 17, wherein the light source is a light emitting diode.

19. The lamp assembly of claim 17, wherein the second chamber is reversibly sealed from the environment by one or more elastomeric seals.

20. The lamp assembly of claim 17, wherein the battery is a rechargeable battery.

* * * * *